United States Patent
Mintz et al.

(10) Patent No.: US 11,756,122 B2
(45) Date of Patent: *Sep. 12, 2023

(54) DISTRIBUTION OF ELECTRONIC MARKET DATA

(71) Applicant: TRADING TECHNOLOGIES INTERNATIONAL INC., Chicago, IL (US)

(72) Inventors: Sagy P. Mintz, Tampa, FL (US); Alexander D. Deitz, New York, NY (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/063,915

(22) Filed: Dec. 9, 2022

(65) Prior Publication Data

US 2023/0108576 A1    Apr. 6, 2023

Related U.S. Application Data

(63) Continuation of application No. 16/863,436, filed on Apr. 30, 2020, now Pat. No. 11,551,297, which is a
(Continued)

(51) Int. Cl.
*G06Q 40/04*    (2012.01)
*G06Q 40/00*    (2023.01)
*H04N 7/173*    (2011.01)
*H04N 7/20*    (2006.01)
*G06F 9/30*     (2018.01)
*G06F 13/10*    (2006.01)
(Continued)

(52) U.S. Cl.
CPC ............. *G06Q 40/04* (2013.01); *G06Q 40/00* (2013.01); *H04N 7/173* (2013.01); *H04N 7/20* (2013.01);
(Continued)

(58) Field of Classification Search
CPC ...................................................... G06Q 40/04
See application file for complete search history.

(56) References Cited

U.S. PATENT DOCUMENTS 6,349,340 B1    2/2002 Dyer et al.
6,526,580 B2    2/2003 Shimomura et al.
(Continued)

OTHER PUBLICATIONS

Maxemchuk, Nicholas F., and David H. Shur. "An Internet multicast system for the stock market." arXiv preprint cs/0002011 (2000). (Year: 2000).*

(Continued)

*Primary Examiner* — Asha Puttaiah
(74) *Attorney, Agent, or Firm* — McDonnell Boehnen Hulbert & Berghoff LLP

(57) ABSTRACT

A system and method are provided that, among other things, can reduce the burden on receiving computers, increase data throughput, reduce system failure, and provide components of a scalable and flexible network architecture. Specifically, the system and method provide a multichannel-multicast network environment for use in dynamically assigning data to channels. This configuration is particularly useful in a trading network environment, as it effectively performs channel reassignments in a way not to disturb the receipt of the underlying data. While the example embodiments described herein pertain to electronic trading, the principles of the present invention may be equally applied in other environments where the advantages presented herein are beneficial.

14 Claims, 5 Drawing Sheets

Related U.S. Application Data continuation of application No. 16/212,086, filed on Dec. 6, 2018, now Pat. No. 10,679,290, which is a continuation of application No. 14/495,841, filed on Sep. 24, 2014, now Pat. No. 10,185,991, which is a continuation of application No. 14/152,061, filed on Jan. 10, 2014, now Pat. No. 8,924,286, which is a continuation of application No. 13/855,843, filed on Apr. 3, 2013, now Pat. No. 8,660,938, which is a continuation of application No. 13/628,445, filed on Sep. 27, 2012, now Pat. No. 8,433,646, which is a continuation of application No. 13/412,896, filed on Mar. 6, 2012, now Pat. No. 8,326,721, which is a continuation of application No. 13/230,693, filed on Sep. 12, 2011, now Pat. No. 8,234,198, and a continuation of application No. 11/691,231, filed on Mar. 26, 2007, now Pat. No. 8,036,965.

(51) Int. Cl.
*G06F 15/16* (2006.01)
*G11C 8/00* (2006.01)
*H04J 3/26* (2006.01)
*H04L 9/00* (2022.01)

(52) U.S. Cl.
CPC ............... *G06F 9/30* (2013.01); *G06F 13/10* (2013.01); *G06F 15/16* (2013.01); *G11C 8/00* (2013.01); *H04J 3/26* (2013.01); *H04L 9/00* (2013.01)

(56) References Cited

U.S. PATENT DOCUMENTS

| | | | |
|---|---|---|---|
| 6,549,935 B1 | 4/2003 | Lapstun et al. |
| 6,757,760 B1 | 6/2004 | Liu et al. |
| 6,993,137 B2 | 1/2006 | Fransdonk |
| 7,212,634 B2 | 5/2007 | Briscoe |
| 7,555,445 B2 | 6/2009 | Moya et al. |
| 8,036,965 B1 | 10/2011 | Mintz et al. |
| 8,234,198 B2 | 7/2012 | Mintz et al. |
| 8,326,721 B2 | 12/2012 | Mintz et al. |
| 8,433,646 B2 | 4/2013 | Mintz et al. |
| 8,660,938 B2 | 2/2014 | Mintz et al. |
| 8,924,286 B2 | 12/2014 | Mintz et al. |
| 2002/0120837 A1 | 8/2002 | Maxemchuk et al. |
| 2005/0197950 A1 | 9/2005 | Moya et al. |
| 2012/0005057 A1 | 1/2012 | Deitz et al. |
| 2012/0173400 A1 | 7/2012 | Deitz et al. |
| 2013/0024357 A1 | 1/2013 | Mintz et al. |
| 2014/0006246 A1 | 1/2014 | Mintz et al. |
| 2014/0249981 A1 | 9/2014 | Mintz et al. |
| 2015/0142634 A1 | 5/2015 | Mintz et al. |
| 2019/0108589 A1 | 4/2019 | Mintz et al. |

OTHER PUBLICATIONS

Riera-Palau, F. & Femenias, G. (2009). OFDM with Adaptive Frequency Diversity. IEEE Signal Processing Letters, 16(10), 837-840 doi:http://dx.doi.org/10.1109/LSP.2009.2025837.

Shang, L. "System-Level Power Analysis and Optimization," Ph.D. Dissertation, Princeton University, United States: New Jersey. Retrieved May 18, 2001, from Dissertations & Theses: Full Text. (Publication No. AAT 3143554).

Zhou, Y., Analysis and Design of Multiple Description Codes for Wired and Wireless Channels, Ph.D. Dissertation, Queen's University, Canada. Retrieved May 18, 2001 from Dissertations & Theses: Full Text. (Publication No. AAT NR37242).

Zhou, S., & Giannkis, G. B. (2000). Generalized Frequency Hopping OFDMA Through Unknown Frequency-Selective Multipath Channels doi:http://dx.doi.org/10.1109/WCNC.2000.904600.

\* cited by examiner

| Channel | Products |
|---|---|
| 1 | A, B, C, D, E |
| 2 | F, G, H, I, J |
| 3 | K, L |
| 4 | M, N, O |
| 5 | Q, R, S, T |
| 6 | U |
| 7 | V, W |
| 8 | X, Y, Z |
| 9 | A1, B1, C1 |
| 10 | D1, D2, D3, D4, D5 |

Figure 2

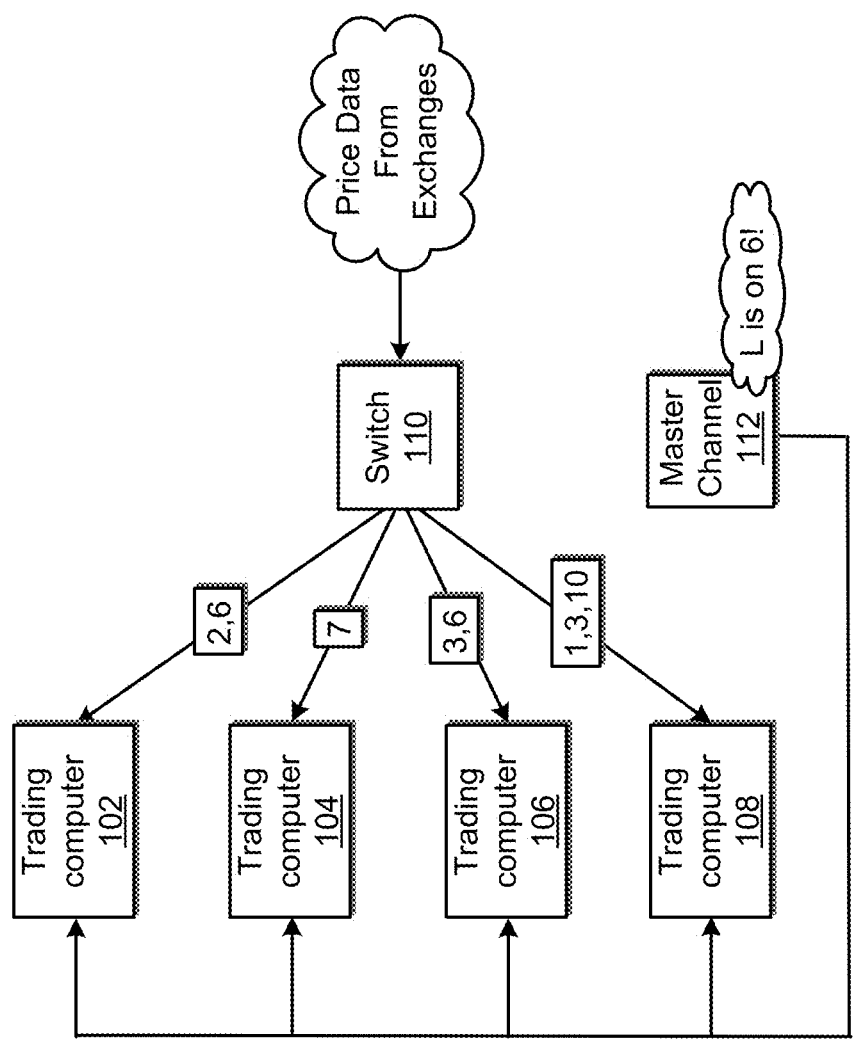

DISTRIBUTION OF ELECTRONIC MARKET DATA

CROSS REFERENCE TO RELATED APPLICATIONS

This application is a continuation of U.S. patent application Ser. No. 16/863,436, filed Apr. 30, 2020, now U.S. Pat. No. 11,551,297, which is a continuation of U.S. patent application Ser. No. 16/212,086 filed Dec. 6, 2018, now U.S. Pat. No. 10,679,290, which is a continuation of U.S. patent application Ser. No. 14/495,841 filed Sep. 24, 2014, now U.S. Pat. No. 10,185,991, which is a continuation of U.S. patent application Ser. No. 14/152,061 filed Jan. 10, 2014, now U.S. Pat. No. 8,924,286, which is a continuation of U.S. patent application Ser. No. 13/855,843 filed Apr. 3, 2013, now U.S. Pat. No. 8,660,938, which is a continuation of U.S. patent application Ser. No. 13/628,445 filed Sep. 27, 2012, now U.S. Pat. No. 8,433,646, which is a continuation of U.S. patent application Ser. No. 13/412,896 filed Mar. 6, 2012, now U.S. Pat. No. 8,326,721, which is a continuation of U.S. patent application Ser. No. 13/230,693 filed Sep. 12, 2011, now U.S. Pat. No. 8,234,198, which is a continuation of U.S. patent application Ser. No. 11/691,231 filed Mar. 26, 2007, now U.S. Pat. No. 8,036,965, entitled "Distribution of Electronic Market Data," the contents of each of which are fully incorporated herein by reference for all purposes

FIELD OF INVENTION

The present invention is directed towards or related to a network and method for use in distributing data in environments such as electronic trading.

BACKGROUND

Electronic trading refers to a trading system that matches orders by an electronic trading platform. Current examples of electronic trading platforms include the Chicago Mercantile Exchange ("CME") Globex® trading system, the Chicago Board of Trade ("CBOT") e-cbot, and Eurex, just to name a few. A trading system that matches orders electronically is also referred to herein as an "electronic exchange." Exchanges like the CME and CBOT currently offer trading via open outcry in addition to electronic trading.

Traders link to an electronic exchange through a computer network. Then, using a front-end trading system, traders can participate in the electronic markets offered by these electronic exchanges. Electronic exchanges or independent companies like Trading Technologies® develop, deploy, and support front-end electronic trading systems that allow traders to access various electronic exchanges. Some of Trading Technologies® products include X_TRADER®, X_STUDY™, X_RISK®, and X_TRADER® APL Presently, certain kinds of market data is multicast to the traders' computers over the network. As known in the art of computing, multicast refers to the delivery of information to many receivers at the same time in a single stream. Typically, the kinds of market data where multicast becomes useful is price information, such as the distribution of a product's current highest bid price, the current lowest ask price, the last trade price, and other types of price information. Currently, a trader may choose to subscribe from a list of hundreds, if not thousands, of different products, in which each product has its own multicast price feed. Generally speaking, the amount of market data, from which a trader may subscribe, will only increase in time as electronic exchanges add new products to their offerings and as the growth of trading volume for particular products grows.

According to one current network configuration type, a subscribing computer on a network must receive every, or nearly every, price feed that comes across the network, as a result of the price feeds having the same multicast address. This network configuration type requires that the subscribing computer filter the price feeds to retrieve the desired price data. The burden due to this undesirable filtering process is substantially increased as the number of computers subscribing to different price feeds are added to the same network and as the price feed for a given product increases as the trading volume for the product increases.

According to another current network configuration type, products are grouped onto several different channels, such that each channel has a certain bandwidth and a different multicast address. While this can reduce the number of price feeds a trader must subscribe to or filter, it works well if all the channels are equally busy and equally needed. Oftentimes, this is not realistic. Trading volume for some products may spike at different times, while the trading volume for other products might not spike at all. As a result, the network becomes underutilized at some times and over utilized at other times. Over utilization can lead to network failure, or at the very least, delayed price feeds. In a competitive environment like electronic trading, where every second (or even a fraction of a second) counts in seizing market opportunities, this rather inflexible network configuration is also an unacceptable long-term solution.

Therefore, what is needed is an improved network configuration that can be utilized going forward by systems that call for the distribution of data in environments such as electronic trading.

SUMMARY

As previously stated, the present invention is directed towards, or related to, a network and method for use in distributing data in environments such as electronic trading. To illustrate the present invention and aspects thereof, the following description including the figures and detailed description provides examples that can be used or readily modified by one of ordinary skill to generate a system or method that benefits from the teachings described and claimed herein. For the most part, the examples provided herein are directed to an electronic trading system. However, as will be stated herein, the present invention is not necessarily limited to an electronic trading system, and can be utilized in other areas where real time data is distributed and/or when data loads can vary.

According to an example described herein, a system and method for distributing price data corresponding to tradeable objects in an electronic trading environment is provided. Price data corresponding to tradeable objects is received from one or more electronic exchanges. An electronic exchange comprises a matching process for matching incoming trade orders. A number of channels is to be used to multicast the price data to the receiving computer devices on a network. The tradeable objects are dynamically assigned to the designated number of channels according to a defined criteria. Price data corresponding to the tradeable objects is communicated over the assigned channels.

According to one aspect of the example system and method, to receive price data at the receiving computers, the assignment information is communicated to the receiving computer devices over a master channel. The assignment information provides the receiving computers with information pertaining to the tradeable objects and corresponding channel assignments. A subscription request is received from at least one of the receiving computers and price data is communicated over the network according to the subscription request. The assignment information can be dynamically updated in response to a change associated with the defined criteria. The updated assignment information can then be communicated in real time to the receiving computers over the master channel.

According to another aspect of the example system and method, for a period of time at the time of updating the assignment information, or around the time of updating, price data can be multicast over the network according to both the updated assignment information and according to the previous assignment information. That way, receiving computers have some time to switch to appropriate channels.

Other features of the present invention will become more apparent to persons having ordinary skill in the art to which the present invention pertains from the following description and claims.

BRIEF DESCRIPTION OF THE FIGURES

Example embodiments are described herein with reference to the following drawings, in which:

FIG. 2 illustrates a table of example assignment information that provides a snapshot in time of product and channel assignments;

FIG. 5 illustrates the close-up view of the of the block diagram previously shown in FIG. 3 to illustrate operation in a trading environment using the dynamically updated assignment information provided in FIG. 4.

DETAILED DESCRIPTION

The present invention provides, or is related to, a network configuration that, among other things, can reduce the burden on receiving computers, increase data throughput, reduce system failure, and provide components of a scalable and flexible network architecture. The present invention is particularly useful in a trading network environment. A trading network environment is one that distributes time sensitive data to receiving computers, such as price data. However, principles of the present invention may be equally applied in other environments where the advantages presented herein are beneficial. To illustrate aspects of the present invention, a system and method are illustrated in example form using the drawings referred to herein. One of ordinary skill will recognize, however, that such examples may be quickly and readily adaptable using the teachings described herein. Aspects of the present invention are protected by the accompanying claims. Limitations from the patent specification should not be improperly incorporated into the claims unless explicitly stated or otherwise inherently known.

I. Example Network Configuration

Figure 1:
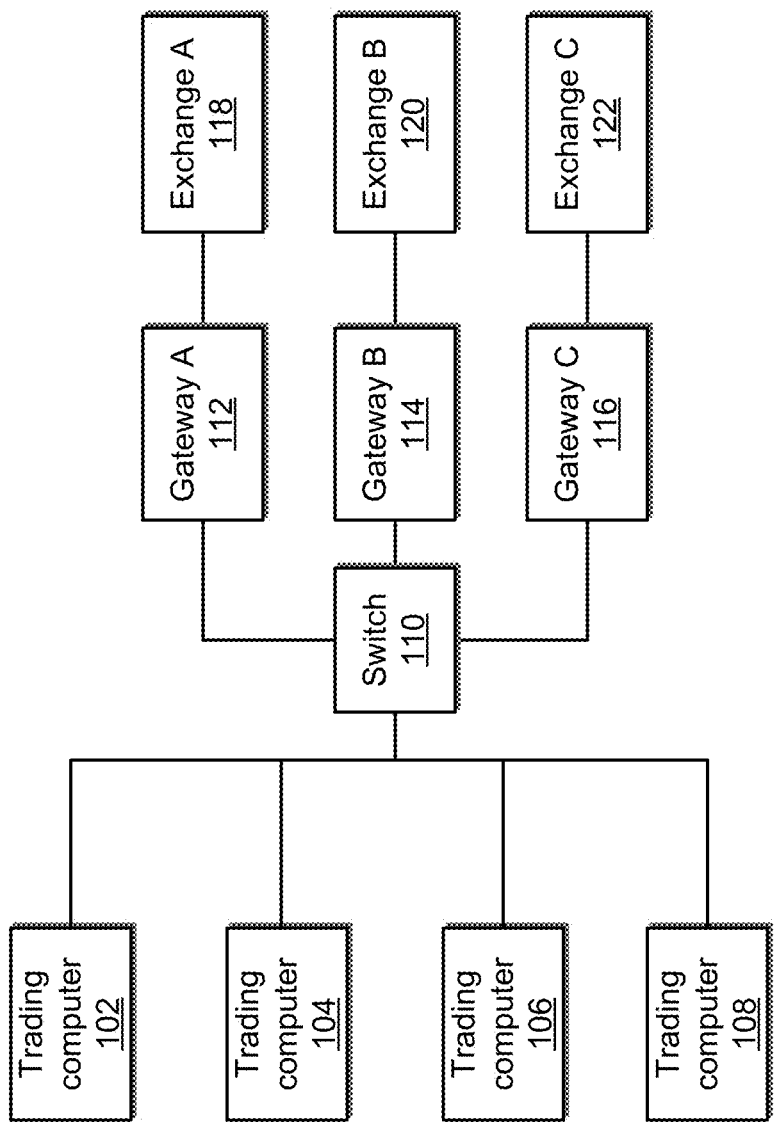
FIG. 1 illustrates a block diagram of a trading network according to an example embodiment.

FIG. 1 illustrates a block diagram of a network according to an example embodiment. Each block in the block diagram is intended to represent a hardware component, a software component, or a combination of hardware and software components. The blocks presently illustrated in FIG. 1 are used to illustrate aspects of the present invention, and therefore more or fewer boxes (or components) may be utilized. As such, the present invention is not limited to the example network configuration shown in the figures, including FIG. 1.

According to FIG. 1, four separate trading computers 102, 104, 106, and 108 are shown. Each trading computer 102, 104, 106, and 108 is used to illustrate a computer, or computers, that runs front-end software solutions. A front-end software solution might include any of the products offered by Trading Technologies® or some other software vendor. While trading computers 102, 104, 106, and 108 are often high-performance computing machines, such hardware is not necessary as standard computers may by used instead. Additionally, if the present invention is utilized in an environment different from electronic trading, then other types of hardware and software may be substituted for a "trading computer." For instance, if the present invention is utilized in the movie or television broadcast industry, then a "set-top box" might be illustrated in place of a trading computer. A set-top box, according to that industry, refers to a device that connects to a television and some external source of signal, and the turns the signal into content displayed on the screen.

Also according to FIG. 1, a switch 110 is shown. The switch 110 is used to illustrate a networking device that can forward information to the trading computers 102, 104, 106, and 108 that has been received from one or more information sources. In the example shown in FIG. 1, the information sources include electronic exchanges (shown in FIG. 1 as exchange A 118, exchange B 120, and exchange C 122). According to this example, the information that is being forwarded includes price data for one or more products. Price data might include the inside market, which is the best bid and best ask price currently available for the product, the last traded price, and other prices for which there is quantity pending in the market. Price data might also include just the inside market of a product or just the market depth prices away from the inside market of the product. Price data may include other items of interest, or include only certain pieces of information. While the example embodiments are described herein as distributing price data, other types of information can be distributed in an electronic trading environment. For instance, order and fill information may be assigned to channels; although order and fill information may not always be multicast due to the private nature of some of the content. Again, if the present invention is utilized in an environment different from electronic trading, then the information that is communicated by switch 110 will likely correspond to that particular environment. For instance, in the movie and television broadcasting industry, such information might correspond to movies, television shows, and commercials.

According to FIG. 1, the switch 110 is in communication with information sources, which according to this example, include gateway A 112 and its corresponding exchange A 118, gateway B 114 and its corresponding exchange B 120, and gateway C 116 and its corresponding exchange C 122. Although it is not necessary for purposes of understanding the present invention, each gateway 112, 114, and 116 receives and translates information from their corresponding exchange 118, 120, and 122, and also transmits information back to their correct exchange 118, 120, and 122. According to the present example, price data corresponding to products traded at the exchanges 118, 120, and 122 can be received at the gateways 112, 114, and 116 and switch 110. While it is not important for purposes of understanding the present invention, it is useful to note that gateways 112, 114, and 116, in some instances, are under the control of the electronic exchanges 118, 120, and 122, and in other instances are under the control of a third party, like Trading Technologies® or the trading firm. Using the ongoing movie and television broadcast industry example to illustrate a different type of network environment, the sources of information might include studios or some other depository of electronic media, rather than an "electronic exchange."

Looking at the overall network configuration in FIG. 1, it is worthwhile to note that the network can be increased in size and/or complexity, if so desired. For instance, the network could include more (or less) than four trading computers. Indeed, a trading network could support hundreds, if not thousands, of trading computers. Also, the network could include additional switches, gateways, and/or exchanges, or include other network intermediary devices not shown in the figure. And while the network can be increased in size and/or complexity, such as understood by one of ordinary skill, it is also worthwhile to note that the present invention does not rely on, or require, such size or complexity. The teachings, as described herein, can be utilized by small, medium, or large sized networks with any degree of complexity. As such, one of ordinary skill will appreciate that the teachings described herein can provide the building blocks for use in designing a network configuration for its intended purpose, and the network, or at least users of the network, will reap the benefits of the present invention.

II. Example Channel and Product Assignments

FIG. 2 illustrates a table of example channels and products. According to FIG. 2, there are ten channels and one or more products are currently assigned to each channel. For instance, products A, B, C, D, and E are currently assigned to "channel 1." Products F, G, H, I, and J are currently assigned to "channel 2," and so on, down through "channel 10." Each product is represented herein by a symbol, such as a letter, for ease of explanation. However, a product more likely would be represented by its own name or acronym. An example product name currently in the futures industry is CME E-Mini® S&P 500® futures. An example product name in the movie or television broadcasting industry would be the title of the movie or show.

As shown in FIG. 2, the number of products might represent all of the products available or they might simply represent a sub-set of the total. For instance, if traders on the same network only trade thirty different products out of three hundred available products, then the channel/product table might only assign the desired thirty products to various channels rather than assign all three hundred products. By way of example, in the area of futures trading, which offers a large number of tradeable products, a subset might include those products that relate only to equities, or foreign exchange, or interest rates, or real estate, and so on. According to another example, a subset might include those products in the area of stock trading according to industry sectors. In the movie or television broadcasting industry, such subsets might be defined according to genre, such as by drama, comedy, or musical.

It may also be useful to assign only certain pieces of information to a channel or at least be given a separate product name. For instance, some traders are interested in only the inside market for a particular product. In that instance, it might be useful for the inside market to be assigned a separate channel or given a special product name. In another instance, some traders might be interested in all of the price data available for the particular product. In that instance, it might be useful for the inside market and the other price information to be assigned to the same channel or given a special product name. In this regard, one could assume that "D1, D2, D3, D4, and D5" shown in FIG. 2 are divided portions of price data for product "D," where "D1" represents the inside market, "D2" represents all price information, "D3" represents the last traded price, and so on. By separating price data in this manner, it is possible to assign the components to other channels, if necessary (e.g., "D2" is consuming too much bandwidth at the moment and needs to be re-assigned to a different channel). For purposes of explanation and to account for these instances, a "product" may also refer to a piece of information like "D1," "D2," "D3," "D4," and "D5."

Irrespective of the product name or type, each product of the group is dynamically assigned to a channel. As such, one could say the channel/product table in FIG. 2 represents a "snapshot" in time of current assignments. That is, the product assignments can dynamically change, which is discussed in greater detail below. The determination of channel assignments at any one time could be based on a number of factors or criteria such as the type of product, volume traded of product (if it is a tradeable product), historical usage information (such as what minutes, hours, or days do certain products tend to be more or less active), anticipated news events, or based on some other desired criteria, or a combination of desired criteria. If it is based on a combination of desired criteria, such as a combination of (1) the type of product and (2) volume traded, for example, then it may be possible to assign one product type (e.g., energy products) over a certain plurality of channels and dynamically move heavily traded products (e.g., oil, electricity, and so on) amongst those channels. Historical usage information becomes particularly relevant when trading for certain products becomes heavier at certain, and often predictable, times of the day. Examples might include higher traded volume in the morning hours or during times when a number of interest comes out (e.g., unemployment number). In the movie and television broadcasting industry, historical usage information might reflect stronger demand in late evenings or weekends, for example, when more people are at home watching television. The assignments can be made accordingly.

Additionally, the channel assignments may be based on a hard-coded set of instructions, which cannot be altered by the user, or alternatively, the assignments may be based on user input, or a combination of hard-coded set of instructions and user input. An example of when the channel assignments could be considered hard-coded is when the electronic exchanges, themselves, assign their products to certain channels. This could be a single electronic exchange effort or an effort applied across the entire industry such that product-channel assignments are understood and followed (and perhaps even regulated). Further elaboration on the industry effort might include assigning energy products to channels one through eleven, currency products to channels eleven through fifteen, and so on. Another example of when the channel assignments could be considered hard-coded is when developers (or software vendors) outside of the exchange control their own hard-coded channel assignments.

However, if the system is based on user input, then a graphical user interface can be provided to receive the necessary input. Then, using the graphical user interface, a trader (or some other user) could assign the products to channels or to a sub-set of channels, and even change assignments. While it is preferred that the assignment information remain at least somewhat dynamic in nature, it is also possible to combine some static assignments with dynamic ones, if so desired.

Generally, the rate of dynamic reassignment is based on how channels are assigned. For instance, if the products are assigned based on product type, then the rate of reassignment would more than likely be low as the number of products added to a product type group are generally low. On the other hand, products that are assigned based on trading volume of the products (resulting in lots of price data), then the rate of reassignment might be higher to balance the load more evenly across the channels. More than not, however, it is preferable to balance loads across one or more channels to possibly increase throughput and to reduce downtime due to channel overloading (which can happen with static assignments).

For purposes of illustration, the number of channels in FIG. 2 are ten, but more or less channels may be designated. In other words, the system and method may utilize any number of channels. The number of channels may be designated by a set of hard-coded instructions, designated by a user, or designated by a combination of hard-coded instructions and the user. Generally speaking, the designation of the number of channels can preferably be tailored to the application, but again, such flexibility is not necessary for purposes of utilizing aspects of the present invention.

III. Example Operation

Figure 3:
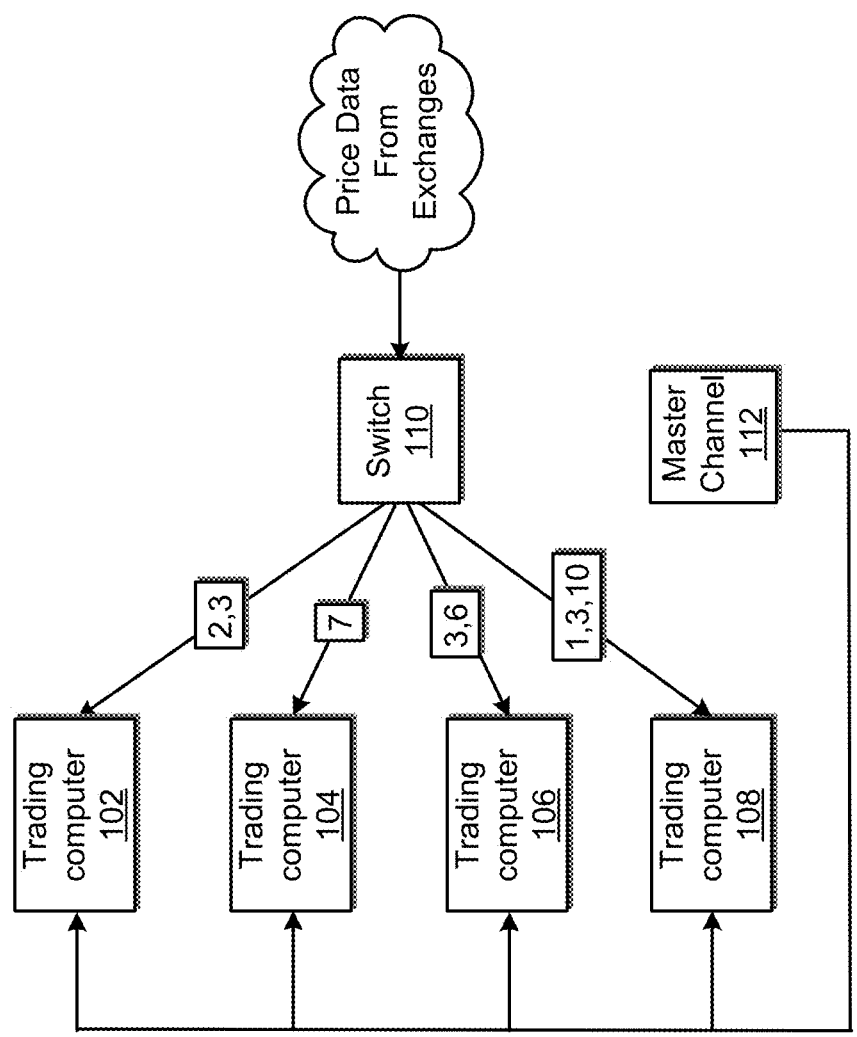
FIG. 3 illustrates a close-up view of the block diagram of FIG. 1 to illustrate operation in a trading environment using the example assignment information provided in FIG. 2.

Turning now to FIG. 3, switch 110 and trading computers 102, 104, 106, and 108 (previously shown in FIG. 1) are shown in close-up view to illustrate operation in a trading environment according to the present invention. Logical connections between the various components are shown to further illustrate this operation. According to the example embodiment of FIG. 3, master channel 112 either has a copy of the channel/product listing (an example channel/product listing is shown in FIG. 2), has access to the channel/product listing, or has generated the channel/product listing. Master channel 112 provides trading computers 102, 104, 106, and 108 with information pertaining to the channel/product listing shown in FIG. 2. Each trading computer 102, 104, 106, and 108 listens to the master channel 112 transmission and then subscribes to the desired channels based on what each computer picks up from the transmission.

According to one example, master channel 112 could represent a stand-alone device that transmits channel/product information to trading computers 102, 104, 106, and 108. According to another example, master channel 112 could instead represent a component of another system, such as part of switch 110, a gateway, or an electronic exchange. Regardless of where the master channel 112 is situated within the network, it preferably provides channel/product assignments to the receiving computers. Then, the receiving computers use that information to make subscription choices. As stated above, master channel 112 could contain a copy of the channel/product listing, such as in memory, or have access to the channel/product listing. If the system is so designed, master channel 112 may actually generate the channel/product listing, such as by listening to electronic exchanges (if they were to transmit that information), or in an alternative example, by listening in on the price data being transmitted by the electronic exchanges.

If master channel 112 is given the responsibility of generating the assignment information, master channel 112 may then also direct components of the network to transmit data according to the channel/product listing. For instance, master channel 112 could direct a gateway (e.g., 112, 114, and 116 in FIG. 1) or even an electronic exchange (e.g., 118, 120, 122 in FIG. 1) what channel to use for a particular product. If master channel 112 directs a gateway, then the gateway can transmit price data to switch 110 on the appropriate channels. If master channel 112 directs an electronic exchange, then the exchange can transmit price data on the appropriate channels. If master channel 112 is part of switch 110, then switch 110 can transmit price data on the appropriate channels. Regardless of when or where in the network product data is actually sorted into the appropriate channels (as the present invention is not so limited), trading computers 102, 104, 106, and 108 can preferably communicate to switch 110 the channels they wish to subscribe to based on the information from master channel 112.

According to this snapshot in time, trading computer 102 has currently subscribed to "channels 2 and 3." It might be that trading computer 102 wishes to trade or view information based on one or all of the products currently assigned to "channels 2 and 3." Now, once channels have been subscribed to, the trading computer 102 can once again verify if indeed these channels are carrying the desired product information. If the channels are in error, then communication may be made back to switch 110 in an attempt to correct the error. However, this extra step of channel/product verification is not necessary for operation. Assuming the assignments are correct and it is the desired information, switch 110 multicasts information, and in this example—price data, onto the network. Trading computer 102 can then tune into "channel I" using known means of multicast addressing or some other relevant protocol.

Trading computer 104 has currently subscribed to "channel 7." Accordingly, switch 110 multicasts information, and in this example—price data relating to products assigned to "channel 7," onto the network. Trading computer 104 can then tune into "channel 7" using known means of multicast addressing or some other relevant protocol.

Trading computer 106 has currently subscribed to "channels 3 and 6." Accordingly, switch 110 multicasts information, and in this example—price data relating to products assigned to "channels 3 and 6," onto the network. Trading computer 106 can then tune into "channels 3 and 6" using known means of multicast addressing or some other relevant protocol. It is useful to note that in this instance, trading computer 106 wishes to receive "channel 3," which has presumably already been subscribed to by trading computer 102. If the channel has already been subscribed to and the information is already being multicast onto the network, then there is no need for switch 110 to multicast the channel again—hence the advantage of multicasting in this environment. Trading computer 106 can get the assignments from the master channel and can simply tune into "channel 3" on the network.

Trading computer 108 has currently subscribed to "channels 1, 3, and 10." Accordingly, switch 110 multicasts information, and in this example—price data relating to products assigned to "channels 1, 3, and 10," onto the network. Trading computer 108 can then tune into "channels 1, 3, and 6" using known means of multicast addressing or some other relevant protocol. It is useful to note again that in this instance, because "channel 3" is presumably already being multicast on the network, then trading computer 108 can get the assignments from the master channel and can simply tune into "channel 3" on the network.

IV. Dynamic Assignment Example

Figure 4:
FIG. 4 illustrates the table of example assignment information, previously shown in FIG. 2, which provides a snapshot in time of product and channel assignments subsequent to the assignment information of FIG. 2.

FIG. 4 illustrates a table of example channels and products previously shown in FIG. 2, but some time later. According to FIG. 4, "product L" was dynamically moved from "channel 3" to "channel 6." As stated above, there are many reasons why the change could have been made, and here are some more illustrative examples:

According to a first example, in a trading environment it could be that "product K" was experiencing high trading volume. As a result, the market was changing rapidly and "product K" needed more bandwidth than was currently given by sharing "channel 3" with "product L." As such, the system determined that "channel 3" is beginning to reach its predefined limit and "channel 6" had the ability to carry the current load of "product L." Thus, the change was made and a product was re-assigned.

According to a second example, in a trading environment it could be that "product L" was experiencing high trading volume, and not "product K." As a result, the market was changing rapidly and "product L" needed more bandwidth than was currently given by sharing "channel 3" with "product K." As such, the system determined that "channel 3" is beginning to reach its predefined limit and "channel 6" had the ability to better carry the current load of "product L." Thus, the change was made and a product was reassigned.

According to a third example, in a trading environment it could be that "product K" was about to experience high trading volume based on historical data—such at a certain time, "product K" typically trades heavy. As such, whether or not "product K" would actually experience high trading volume on this day, the system determined in advance that "channel 3" would quickly reach its predefined limit based on this historical evidence and also determined that "channel 6" had the ability to better carry the current load of "product L." Thus, the change was made and a product was reassigned.

According to a fourth example, in a trading environment it could be that the trader behind trading computer 106 and the trader behind trading computer 108 wished only to trade "product L." Thus, in an effort to reduce the number of multicasts over the network, the system dynamically reassigned "product L" to "channel 6." The system could then stop multicasting "channel 3." The change was made and a product was reassigned.

V. Example Network Operation with Dynamic Assignment

Turning to FIG. 5, switch 110 and trading computers 102, 104, 106, and 108 (previously shown in FIGS. 1 and 3) are shown in close-up view to illustrate operation in a trading environment according to the present invention. To reflect the change shown in FIG. 4, master channel transmits that "product L" is now on "channel 6." Under the assumption that the trader sitting behind trading computer 102 wishes to trade only "product L" on "channel 3" then trading computer 102 will subscribe to "channel 6" and drop the subscription to "channel 3."

In the examples illustrated by FIGS. 1 through 5, price data was being sent from electronic exchanges. Most often, electronic trading requires the most up-to-date market information and cannot afford downtime during channel reassignments. To reduce or eliminate downtime due to channel reassignments, the master channel can be programmed to broadcast channel reassignments in advance of dropping the product from a given channel. For instance, according to the example illustrated in FIGS. 4 and 5, once it is determined that "product L" will be dynamically moved to "channel 6" the master channel can start broadcasting the change, up to an "N" number of seconds (where N represents a number) before "product L" gets dropped from "channel 3." During the "N" seconds, "product L" will be multicast on "channels 3 and 6." Preferably, this designated amount of time will be enough for trading computer 102 to make the appropriate change.

If the network was applied in another environment like telecom, then rather than risk the dropping of a call or a message, the old channel (before the change in assignment) and the new channel (after the change in assignment) could be programmed to send the same data simultaneously. That way, subscribing devices can make the channel switch without experiencing a loss of data (or significantly reduced loss of data).

Intelligent logic may be applied to the system to result in further advantages. For instance, the system may dynamically assign products to channels based on what is currently being traded. For instance, if a trader adds a subscription to a product on a channel that no one else on the network trades, then the system might dynamically assign that product to a new channel, so as not to disturb the other trading computers. The system might also dynamically assign products to channels based on an algorithm to reduce bandwidth consumption or system resources. As such, the system may be programmed according to an algorithm to dynamically add channels, reduce channels, change the assignments, and so on to achieve a desired goal (e.g., increasing throughput and/or reducing system failure). While this logic may be applied at any device in the system given the responsibility of assigning products to channels, using the examples above, such logic could be effectively applied at the master channel (112 in FIGS. 3 and 5) if the master channel was also given the responsibility of generating and/or directing the assignments.

VI. CONCLUSION

As stated herein, the present invention provides a network configuration that, among other things, can reduce the burden on receiving computers, increase data throughput, reduce system failure, and provide components of a scalable and flexible network architecture. It is understood that systems that utilize aspects of the present invention will not necessarily enjoy all of the same advantages. For instance, application of the teachings described herein to certain systems might increase data throughput, while other applications will result in reduced system failure. As such, it is understood that a later developed system, which utilizes the claimed invention, will read on the presently claimed invention even if the system does not enjoy one or more of the advantages described herein. Moreover, aspects of the present invention may be utilized over a short duration, and therefore, may still read on the claimed invention.

For example, the burden on receiving computers can be reduced because the information, which is communicated over the network, is neatly packaged onto channels that can be dynamically tailored according to certain criteria. The burden on receiving computers can also be reduced by simply reducing the amount of information that is communicated onto the network that requires filtering at the computer, such as by careful product/channel assignments.

System failure can be reduced in some systems by performing appropriate load balancing across many channels. That way, systems will experience overloads or network delays due to large increases in information attempting to pass through a set channel size. Load balancing may also result in increasing overall system throughput.

The example embodiment were illustrated in a trading environment. Specifically, "products" were used and assigned to channels. It should be understood that a "product" (which also refers to a "tradeable object") refers to anything that can be traded with a price and quantity. It includes, but is not limited to, all types of tradeable events, goods, and financial products. For instance, stocks, options, bonds, futures, currency, and warrants, as well as funds, derivatives and collections of the foregoing, and all types of commodities, such as grains, energy, and metals may be considered tradeable objects. A tradeable object may be "real," such as products that are listed by an exchange for trading, or "synthetic," such as a combination of real products that is created by the user. A tradeable object could actually be a combination of other tradeable object, such as a class of tradeable objects.

Although the example programs, processes, methods and system has been described and illustrated in detail, it is clearly understood that the same is by way of illustration and example only and is not to be taken by way of limitation. Since numerous modifications and changes will readily occur to those skilled in the art, it is not desired to limit the invention to the exact construction and operation shown and described, and accordingly, all suitable modifications and equivalents may be resorted to, falling within the scope of the invention.

According to one embodiment, the example system takes the form of a computer program product that is stored on a computer readable storage medium and is executed by a suitable instruction execution system in the computer-based device. The term computer readable medium, as used herein, refers to any medium that participates in providing instructions to processor for execution. Such a medium may take many forms, including but not limited to, nonvolatile media, volatile media, and transmission media. Nonvolatile media includes, for example, optical or magnetic disks, such as storage device. Volatile media includes dynamic memory, such as main memory or RAM (random access memory). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

According to an alternative embodiment, a hardware embodiment might take a variety of different forms. A hardware embodiment may be implemented as an integrated circuit with custom gate arrays or an application specific integrated circuit ("ASIC"). A hardware embodiment may also be implemented with discrete hardware components and circuitry. In particular, it is understood that the logic structures and method step described in the flow diagrams may be implemented in dedicated hardware such as an ASIC, or as program instructions carried out by a microprocessor or other computing device.

What is claimed is:

1. A system comprising:
    a computing device configured to transmit a market data feed related to a tradeable object to a receiving computer device over a first communication channel based on tradeable object assignment information;
    wherein the computing device is configured to dynamically update the tradeable object assignment information to reassign the tradeable object to a second communication channel based on market data related to the tradeable object; and, in response to updating,
    wherein the computing device is configured to transmit the market data feed related to the tradeable object over both the first communication channel and the second communication channel to the receiving computer device to allow the receiving computer device to switch to the second communication channel.

2. The system of claim 1, wherein the market data used to reassign the tradeable object to the second communication channel comprises historical market data related to the tradeable object.

3. The system of claim 2, wherein the historical market data comprises historical traded volume data related to the tradeable object.

4. The system of claim 1, wherein the market data used to reassign the tradeable object to the second communication channel comprises current traded volume data related to the tradeable object.

5. The system of claim 1, wherein the market data feed is transmitted over both the first communication channel and the second communication channel for a predetermined period of time after the assignment information is updated.

6. The system of claim 5, wherein the market data feed is not transmitted over the first communication channel after the predetermined period of time expires.

7. The system of claim 1, wherein the receiving computer device comprises a client device.

8. The system of claim 1, wherein the processor is located at a gateway.

9. The system of claim 1, wherein the processor is located at an electronic exchange.

10. The system of claim 1, wherein the market data feed comprises price data for the tradeable object.

11. The system of claim 1, wherein the price data comprises a portion of the price data available for the tradeable object.

12. The system of claim 1, wherein dynamically updating the assignment information is further based on a type of the tradeable object.

13. The system of claim 1, wherein dynamically updating the assignment information is further based on a news event that affects a market for the tradeable object.

14. The system of claim 1, wherein the computing device is further configured to:
    provide updated assignment information to the receiving computer device.

* * * * *

UNITED STATES PATENT AND TRADEMARK OFFICE
CERTIFICATE OF CORRECTION

| | |
|---|---|
| PATENT NO. | : 11,756,122 B2 |
| APPLICATION NO. | : 18/063915 |
| DATED | : September 12, 2023 |
| INVENTOR(S) | : Sagy P. Mintz and Alexander D. Deitz |

Page 1 of 1

It is certified that error appears in the above-identified patent and that said Letters Patent is hereby corrected as shown below:

On the Title Page

Item (63), page 2, Lines 16-18:
"and a continuation of application No. 11/691,231, filed on Mar. 26, 2007, now Pat. No. 8,036,965."
Should read:
"which is a continuation of application No. 11/691,231, filed on Mar. 26, 2007, now Pat. No. 8,036,965."

Signed and Sealed this
Twentieth Day of May, 2025

Coke Morgan Stewart
*Acting Director of the United States Patent and Trademark Office*